United States Patent
Jorgensen

(10) Patent No.: US 9,766,912 B1
(45) Date of Patent: Sep. 19, 2017

(54) VIRTUAL MACHINE CONFIGURATION

(71) Applicant: Amazon Technologies, inc., Reno, NV (US)

(72) Inventor: Andrew James Jorgensen, Lynnwood, WA (US)

(73) Assignee: Amazon Technologies, Inc., Reno, NV (US)

( * ) Notice: Subject to any disclaimer, the term of this patent is extended or adjusted under 35 U.S.C. 154(b) by 95 days.

(21) Appl. No.: 13/686,683

(22) Filed: Nov. 27, 2012

(51) Int. Cl.
*G06F 9/455* (2006.01)
*G06F 15/173* (2006.01)
*G06F 9/48* (2006.01)
*G06F 9/50* (2006.01)

(52) U.S. Cl.
CPC .......... *G06F 9/45533* (2013.01); *G06F 9/455* (2013.01); *G06F 9/45558* (2013.01); *G06F 9/48* (2013.01); *G06F 9/4843* (2013.01); *G06F 9/4856* (2013.01); *G06F 9/4881* (2013.01); *G06F 9/50* (2013.01); *G06F 9/5005* (2013.01); *G06F 9/5011* (2013.01); *G06F 9/5027* (2013.01); *G06F 9/5077* (2013.01); *G06F 2009/4557* (2013.01); *G06F 2009/45562* (2013.01); *G06F 2009/45575* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,108,855 B2 * | 1/2012 | Dias et al. ..................... | 717/177 |
| 2007/0106993 A1 * | 5/2007 | Largman et al. ............. | 718/104 |
| 2007/0234356 A1 * | 10/2007 | Martins et al. .................. | 718/1 |
| 2009/0083404 A1 * | 3/2009 | Lenzmeier et al. .......... | 709/221 |
| 2009/0125902 A1 * | 5/2009 | Ghosh et al. ..................... | 718/1 |
| 2009/0204961 A1 * | 8/2009 | DeHaan et al. .................. | 718/1 |
| 2009/0282404 A1 * | 11/2009 | Khandekar ......... | G06F 9/45558 718/1 |
| 2010/0306774 A1 * | 12/2010 | Kalbarga .......................... | 718/1 |
| 2010/0325191 A1 * | 12/2010 | Jung ...................... | G06F 15/16 709/202 |
| 2011/0004676 A1 * | 1/2011 | Kawato ......................... | 709/221 |
| 2011/0010710 A1 * | 1/2011 | Thrush et al. .................... | 718/1 |
| 2011/0078680 A1 * | 3/2011 | Lagergren et al. ............... | 718/1 |
| 2011/0302580 A1 * | 12/2011 | Iikura et al. ...................... | 718/1 |
| 2012/0159469 A1 * | 6/2012 | Laor ..................... | G06F 9/4555 717/173 |
| 2012/0266169 A1 * | 10/2012 | Lagergren et al. ............... | 718/1 |
| 2013/0086585 A1 * | 4/2013 | Huang et al. ..................... | 718/1 |
| 2013/0212579 A1 * | 8/2013 | Ben-Shaul et al. .............. | 718/1 |
| 2013/0247045 A1 * | 9/2013 | Fitzgerald .............. | G06F 9/455 718/1 |

\* cited by examiner

*Primary Examiner* — Charles Swift
(74) *Attorney, Agent, or Firm* — Klarquist Sparkman, LLP

(57) ABSTRACT

Embodiments are disclosed for launching a virtual machine and then configuring the virtual machine after launch. Metadata configuration information can be stored in conjunction with virtual machine image configuration data. The virtual machine image configuration data can be used to launch a virtual machine. The metadata configuration information can then be used to further configure the virtual machine after launch. Both the metadata configuration information and the virtual machine image configuration data can be stored in the same virtual machine registration record.

19 Claims, 8 Drawing Sheets

VIRTUAL MACHINE CONFIGURATION

BACKGROUND

A virtual machine image contains an operating system (e.g., Linux) and other data needed to launch a virtual machine in a virtual environment. The virtual machine image is similar to a physical computer's disk volume, and can include a file system, the operating system and other components needed to boot up as a machine.

To launch a virtual machine, hardware needs to be selected. The hardware selection is accomplished through instance types, which allow a variety of different sizes of memory, CPU capacity, I/O performance, etc. The combination of the virtual machine image and the instance type can be used to create an "instance" or a virtual machine.

The launched virtual machine also has a "volume" associated with it, which is like a virtual hard disk of the virtual machine. A snapshot is a copy of the volume at a given point in time and allows a user to preserve the state of the virtual machine. Of course, the snapshot includes software from the original source virtual machine image.

Snapshots can also be used to create a new virtual machine image. In this way, third parties can take generic virtual machine images, add new components and re-package the snapshots as a new virtual machine image usable by others.

One problem with virtual machine images made from snapshots is that updates are often ignored. For example, if Linux has a new security patch release, a cloud provider may update the source virtual machine image, but any already-created snapshot will not be updated, unless the third party takes the updated source virtual machine image, adds the same components to it and again re-packages it as a new virtual machine image.

DETAILED DESCRIPTION

Figure 1:
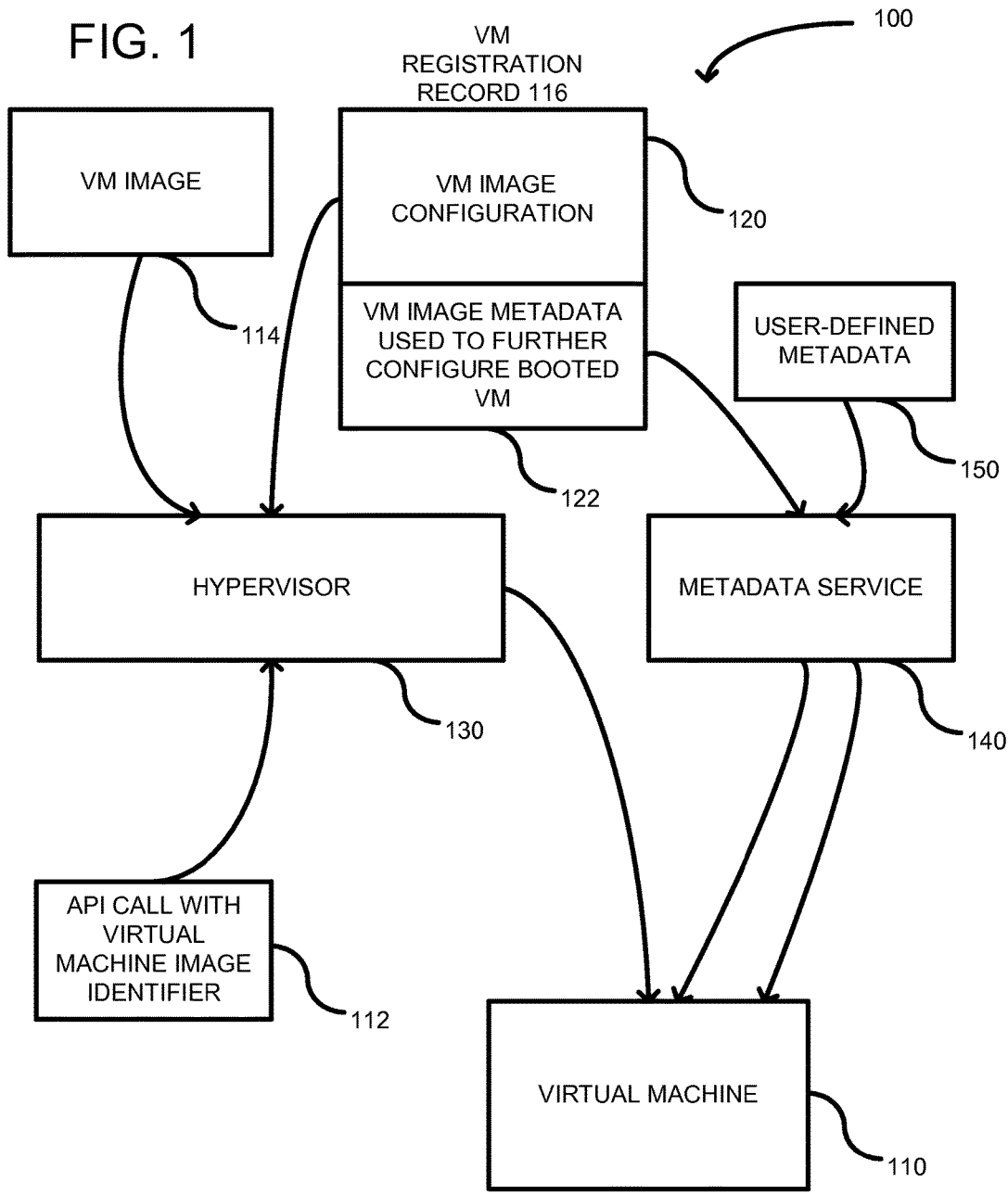
FIG. 1 shows an example system diagram used for allowing configuration of a virtual machine.

FIG. 1 is a system diagram 100 used for allowing configuration of a virtual machine. To launch a virtual machine 110, an API call 112 is made with an virtual machine image identifier. The identifier can be used to identify a virtual machine (VM) image 114 and a VM registration record 116. For example, the identifier can be used to determine the appropriate VM registration record, which can, in turn, point to the VM image. Alternatively, the identifier can be used to determine the VM image, which can include a pointer to the VM image configuration. Other implementations can also be used. The VM image 114 is analogous to a hard disk drive volume and contains software to run in the virtual machine 110. For example, the VM image can include a file system, operating system, etc. needed to boot the virtual machine. The VM registration record 116 can include a VM image configuration 120 that identifies the virtual hardware used as a platform for the virtual machine image. Example data stored in the VM image configuration includes the architecture, the target virtualization type, an operating system type, which kernel to launch with, which additional virtual disk images should be attached to the instance once it is launched. The VM registration record 116 can further include metadata 122 (hereinafter called "metadata configuration information") that can be used to further configure the VM 110 after it is launched. For example, the metadata configuration information can identify different software packages to be loaded into the VM 110. The metadata configuration information can be free-form data that is interpreted by the VM 110. The metadata configuration information can further include one or more executable binaries. The metadata configuration information can be stored and determined in a number of ways. For example, it can be included in the VM image configuration, the VM image configuration can have a pointer to the metadata configuration information, there can be a separate record that points to both the VM image configuration and separately to the metadata configuration information, etc. Additionally, the metadata configuration information can be stored in one or more files. When the API call 112 is received, a hypervisor 130 uses the VM image identifier to determine the associated VM image 114 and VM image configuration 120. The hypervisor 130 can then launch the virtual machine 110 using the VM image 114 in conjunction with the VM image configuration 120. The VM 110 can include code for retrieving the metadata configuration information 122 using a metadata service 140. Other techniques can be used (e.g., device driver, etc.), for delivering the metadata configuration information 122 to the VM 110, as is well understood in the art. The supplied metadata can be interpreted by the VM 110 or otherwise executed by the VM. The metadata configuration information 122 can be changeable by a third-party vendor or others for allowing the VM 110 to be appropriately customized for use. Generally, customization of the VM 110 using the metadata configuration information 122 occurs after launch of the VM. Another way to further customize the VM 110 is through user-defined metadata 150, which can be included or identified in the request 112. One difference between the user-defined metadata 150 and the metadata configuration information 122 is that the latter is associated with the VM image configuration 120 either through the use of pointers or because it is in the same VM registration record 116. By contrast, the user-defined metadata is generally not directly linked to the VM image configuration 120. Instead, the user-defined metadata is generally included in the request 112. Thus, the user stores the user-defined metadata themselves and makes it part of the request.

Another difference is that the user-defined metadata 150 is generally supplied by the same user that generated the API call, whereas the metadata configuration information 120 can be generated by a third-party vendor.

In a market environment, the metadata configuration information can be sold by vendors and purchased by customers. For example, a customer can purchase the metadata configuration information, which provides them access to the metadata configuration information when launching a VM. Alternatively, a user can send a request to launch a VM using the metadata configuration information and is charged a higher price for the customized launch.

Figure 2:
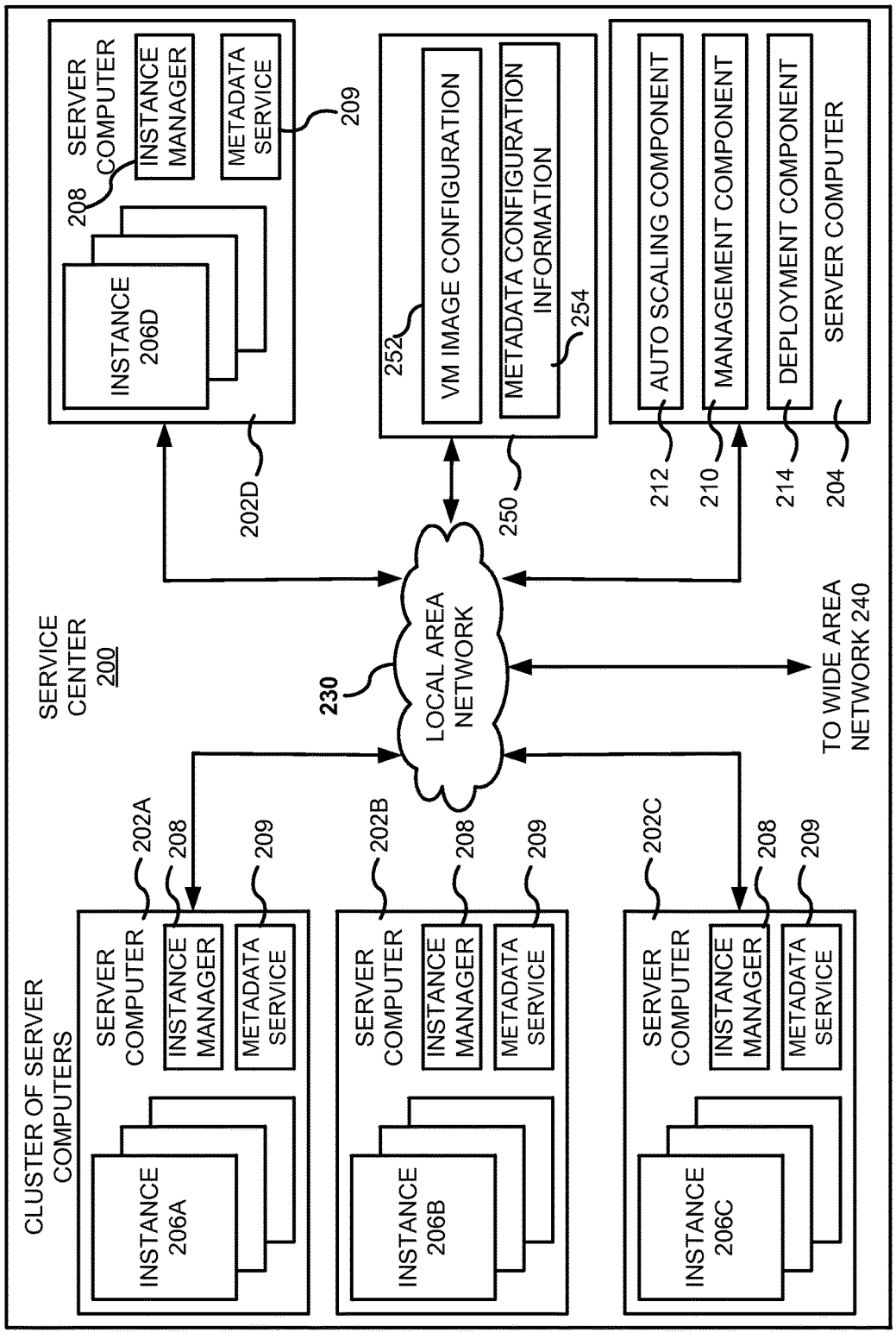
FIG. 2 is a particular example system for allowing configuration of a virtual machine.

FIG. 2 is a computing system diagram of a network-based service center 200 that illustrates one environment in which VM configuration can be used. By way of background, the service center 200 (i.e., the cloud provider) is capable of delivery of computing and storage capacity as a service to a community of end recipients. Generally speaking, the service center 200 can provide the following models: Infrastructure as a Service, Platform as a Service, and/or Software as a Service (SaaS). Other models can be provided. For the IaaS model, the service center 200 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the service center platform without the cost of buying and managing the underlying hardware and software. The SaaS model allows installation and operation of application software in the service center. In some embodiments, end users access the service center 200 using networked client devices, such as desktop computers, laptops, tablets, smartphones, etc. running web browsers or other lightweight client applications. Those skilled in the art will recognize that the service center 200 can be described as a "cloud" environment.

The particular illustrated service center 200 includes a plurality of server computers 202A-202D. While only four server computers are shown, any number can be used, and large centers can include thousands of server computers. The server computers 202A-202D can provide computing resources for executing software instances 206A-206D. In one embodiment, the instances 206A-206D are virtual machines. As known in the art, a virtual machine is an instance of a software implementation of a machine (i.e. a computer) that executes applications like a physical machine. In the example of virtual machine, each of the servers 202A-202D can be configured to execute an instance manager 208 capable of executing the instances. The instance manager 208 can be a hypervisor or another type of program configured to enable the execution of multiple instances 206 on a single server. Additionally, each of the instances 206 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

A server computer 204 can be reserved for executing software components for managing the operation of the server computers 202 and the instances 206. For example, the server computer 204 can execute a management component 210. A customer can access the management component 210 to configure various aspects of the operation of the instances 206 purchased by the customer. For example, the customer can purchase, rent or lease instances and make changes to the configuration of the instances. The customer can also specify settings regarding how the purchased instances are to be scaled in response to demand. An auto scaling component 212 can scale the instances 206 based upon rules defined by the customer. In one embodiment, the auto scaling component 212 allows a customer to specify scale-up rules for use in determining when new instances should be instantiated and scale-down rules for use in determining when existing instances should be terminated. The auto scaling component 212 can consist of a number of subcomponents executing on different server computers 202 or other computing devices. The auto scaling component 212 can monitor available computing resources over an internal management network and modify resources available based on need.

A deployment component 214 can be used to assist customers in the deployment of new instances 206 of computing resources. The deployment component can have access to account information associated with the instances, such as who is the owner of the account, credit card information, country of the owner, etc. The deployment component 214 can receive a configuration from a customer that includes data describing how new instances 206 should be configured. For example, the configuration can specify one or more applications to be installed in new instances 206, provide scripts and/or other types of code to be executed for configuring new instances 206, provide cache logic specifying how an application cache should be prepared, and other types of information. The deployment component 214 can utilize the customer-provided configuration and cache logic to configure, prime, and launch new instances 206. The configuration, cache logic, and other information may be specified by a customer using the management component 210 or by providing this information directly to the deployment component 214.

The deployment component 214 can receive an API call for launching a new instance 206 and use an identifier associated therewith to determine a VM registration record 250, which can be stored in a database, on a server computer, etc. The VM registration record 250 can include a VM image configuration 252 and metadata configuration information 254, similar to those already described. The deployment component can then use the VM registration record 250 to launch a VM.

A network 230 can be utilized to interconnect the server computers 202A-202D and the server computer 204, 250. The network 230 can be a local area network (LAN) and can be connected to a Wide Area Network (WAN) 240 so that end users can access the service center 200. It should be appreciated that the network topology illustrated in FIG. 2 has been simplified and that many more networks and networking devices can be utilized to interconnect the various computing systems disclosed herein.

Figure 3:
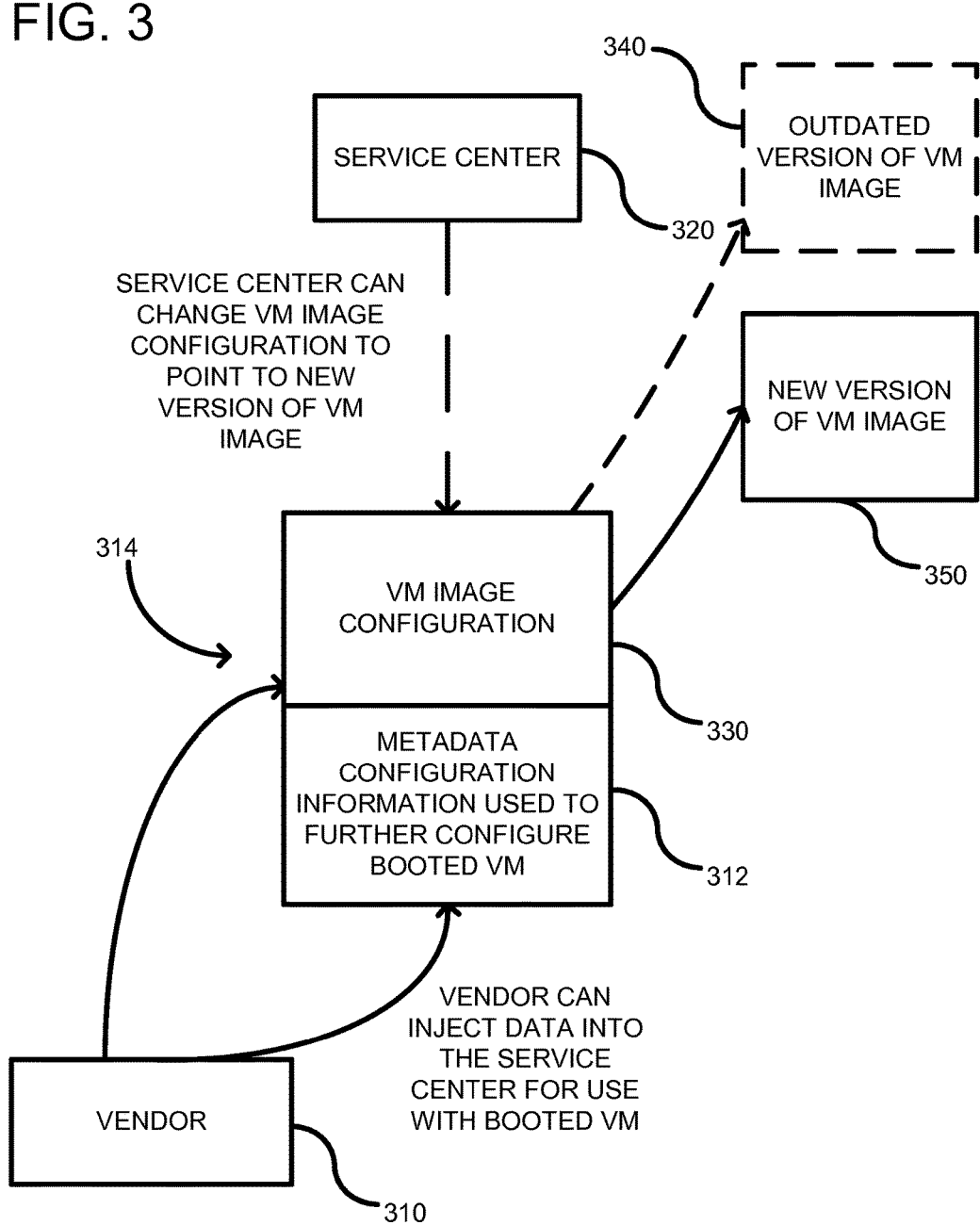
FIG. 3 shows a third-party vendor injecting metadata into a virtual machine registration record and a service center updating a pointer to a virtual machine image.

FIG. 3 illustrates some of the advantages of the embodiments described herein. For example, a third-party vendor 310 can inject metadata configuration information 312 into a VM registration record 314 and a service center 320 can update a pointer to a virtual machine image, as further described below. The VM registration record 314 can include a VM image configuration 330 and the metadata configuration information 312. The VM image configuration 330 can be associated with the metadata configuration information in a variety of ways, such as being in the same record 314, linked through a pointer, etc. By being associated with each other, both the metadata 312 and the VM image configuration 330 can be identified using a simple API call with a VM image identifier. The third-party vendor 310 can inject the metadata configuration information 312 into the VM registration record to change how a VM is configured upon launch by a different user. In any of the embodiments described herein, the injected metadata can be encrypted for security reasons, and is later decrypted by the launched VM. Additionally, if the service center 320 updates a VM image from an outdated version 340 to a new version 350, the vendor can merely change a pointer in the VM image configuration to point to the new version. Alternatively, the service center 320 can update the VM image configuration 330, as shown by the dashed line between the service center 320 and the VM image configuration. Thus, such a change would be transparent to a user, as the user continues to use the same VM image identifier. Additionally, the third-party vendor 310 obtains the advantages of using the new version of the VM image 350 with the metadata configuration information 312. By doing so, the third-party vendor 310 obtains the advantages of using a snapshot, but with updates applied to the VM image.

Figure 4:
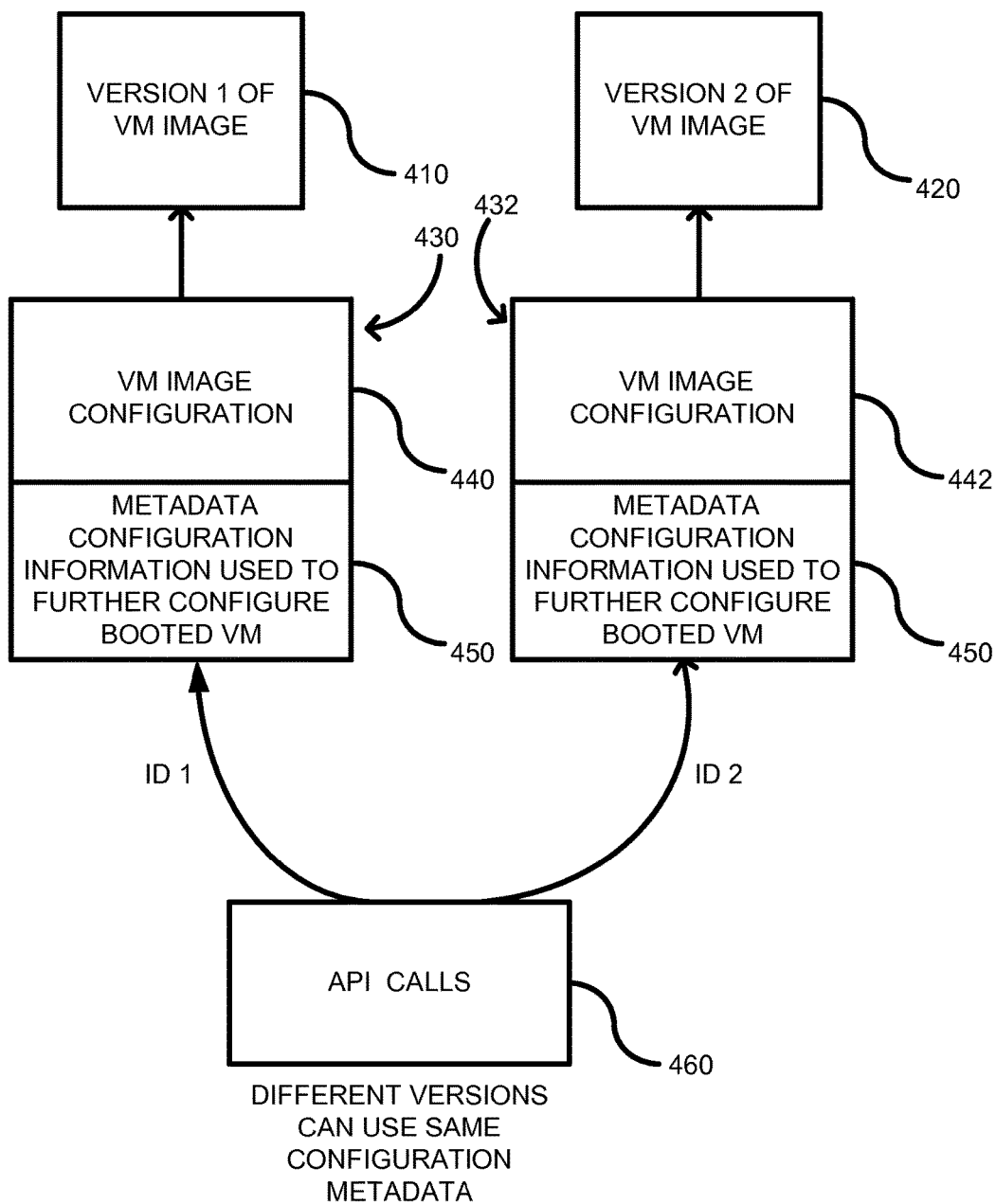
FIG. 4 shows metadata configuration information used on multiple versions of a virtual machine image.

FIG. 4 shows metadata configuration information used on multiple versions of a virtual machine image. As shown, two separate versions of a VM image 410, 420 can be used. For example, VM image 420 can include recent software updates that are not included in version 410. Each version 410, 420 can have its own respective VM registration record 430, 432 with corresponding VM image configurations 440, 442. However, a third-party vendor can allow their metadata configuration information 450 to be the same in both VM registration records. In this way, the same metadata configuration 450 can be applied to different API calls 460 having different VM image identifiers, ID1, ID2. Thus, an updated version of a VM image can receive a different VM image identifier.

Figure 5:
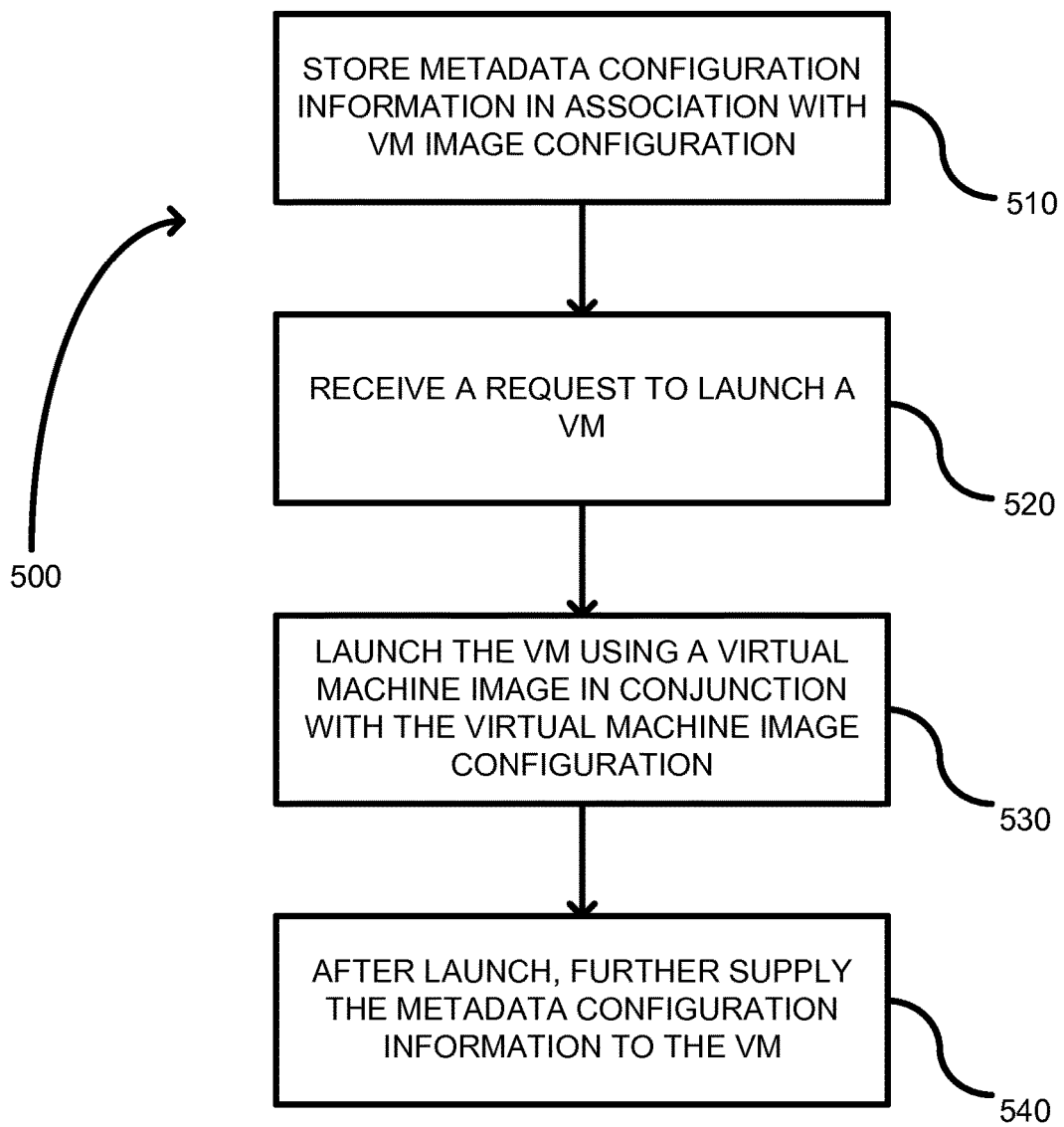
FIG. 5 is a flowchart of an embodiment for launching a virtual machine configured according to metadata configuration information.

FIG. 5 is a flowchart of a method 500 for launching a virtual machine configured according to metadata configuration information. In process block 510, metadata configuration information can be stored in association with VM image configuration. The association can be to have the metadata configuration information in the same registration record as the VM image configuration. Other techniques can be used as already described, such as a pointer within the VM image configuration pointing to the metadata configuration information, etc. In process block 520, a request can be received to launch a VM. In process block 530, a VM can be launched using the VM image in conjunction with the VM image configuration. As previously described, the VM image defines software to be executed on hardware identified by the VM image configuration. In process block 540, after launch, further configuration information can be supplied to the VM using the metadata configuration information.

Figure 6:
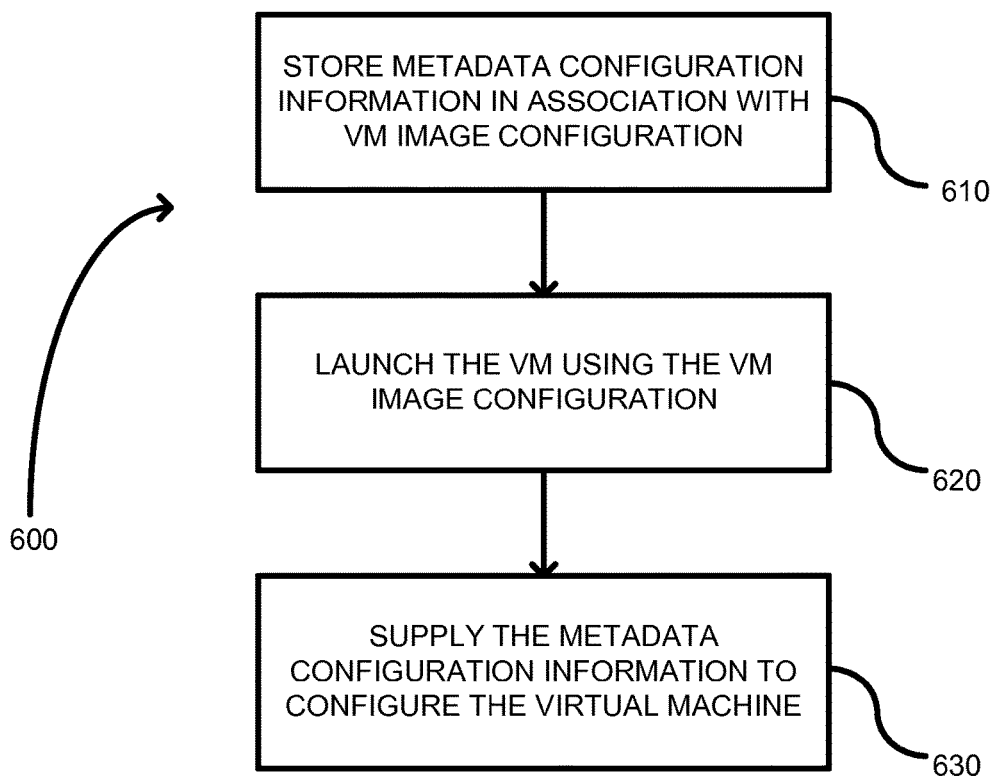
FIG. 6 is a flowchart of another embodiment for configuring a virtual machine using metadata configuration information.

FIG. 6 is another embodiment of a method 600 for supplying configuration information to launch a virtual machine configured according to metadata configuration information. In process block 610, metadata configuration information is stored in association with VM image configuration. In process block 620, a VM is launched using the VM image configuration. For example, a hypervisor can be used to launch the VM in a well-known manner. In process block 630, after launching the VM, the metadata configuration information is supplied to the VM to configure the VM.. The VM can obtain the metadata configuration information through a metadata service.

Figure 7:
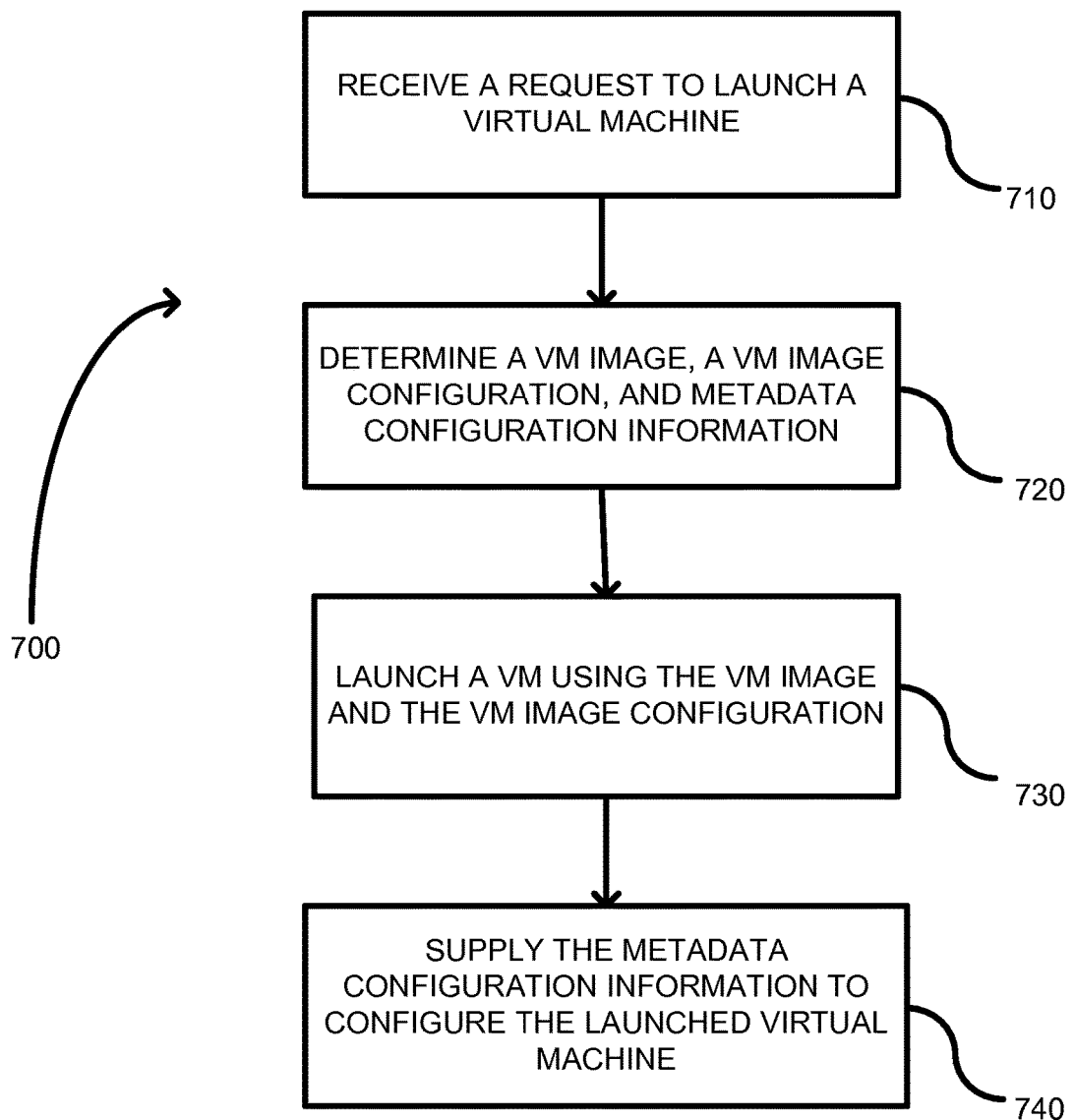
FIG. 7 is a flowchart of another embodiment for configuring a virtual machine using metadata configuration information.

FIG. 7 is still another embodiment of a method 700 for launching a VM configured according to metadata configuration information. In process block 710, a request is received including a VM image identifier. In process block 720, a VM image, a VM image configuration, and metadata configuration information can be determined. Determining can take a variety of forms. For example, the request to launch the VM can include an identifier. Identification can be accomplished by having linked or associated records, wherein at least one of the records is identified by the VM image identifier. Alternative implementations can have a repository of metadata configuration information and the request includes a pointer to one of the metadata configuration information records. In process block 730, a VM can be launched using the VM image and the VM image configuration. In process block 740, the metadata configuration information can be supplied to the launched VM, such as through a device driver or metadata service.

Figure 8:
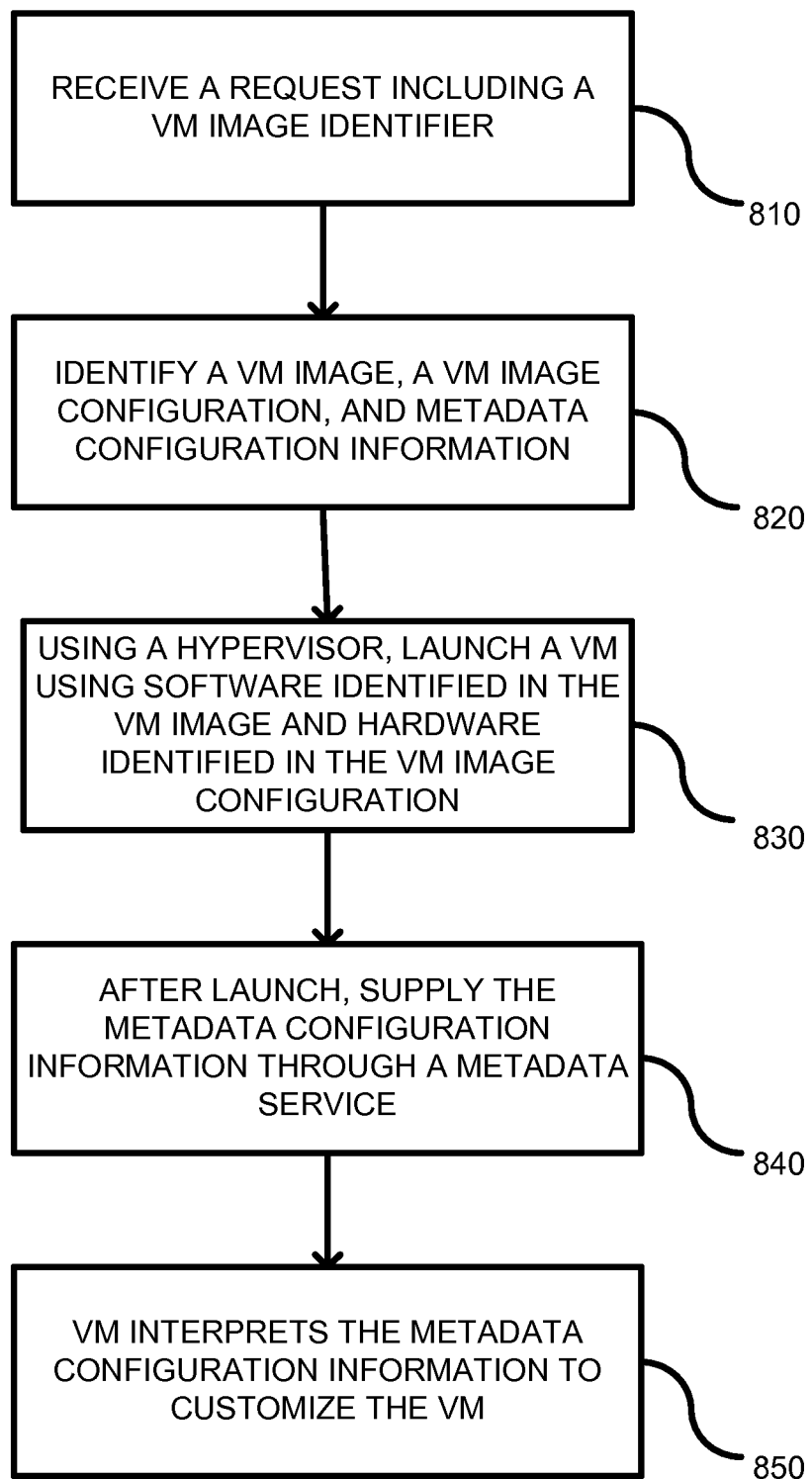
FIG. 8 is a flowchart of another embodiment for configuring a virtual machine using metadata configuration information.

FIG. 8 is a detailed flowchart of an embodiment for launching and configuring a VM. In process block 810, a request is received including a VM image identifier. The request is generally in the form of an API call and includes an identification of the VM image. The request can include other information, as is well understood in the art. In process block 820, the VM image, a VM image configuration, and metadata configuration can be identified. In process block 830, a hypervisor can launch the VM using software associated with the VM image and hardware identified in the VM image configuration. For example, the software can include a Microsoft® Windows® operating system and the hardware can specify an amount of memory, an amount of CPU power, I/O performance, etc. In process block 840, after the VM is launched, it can be further configured to customize the VM. The metadata configuration information is supplied through a metadata service associated with the hypervisor. The metadata service passes the metadata configuration information to the VM, which then interprets the metadata to perform a self-configuration.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as flash memory or hard drives)) and executed on a computer. As should be readily understood, the term computer-readable storage media does not include communication connections, such as modulated data signals.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, or any other suitable programming language. Likewise, the disclosed technology is not limited to any particular computer or type of hardware.

Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an Intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of supplying configuration information to a virtual machine, comprising:
    storing metadata configuration information in a same registration record with a virtual machine image configuration in a service center, so that both the virtual machine image configuration and the metadata configuration information are identified by a single Application Programming Interface (API) request with a single identifier to a virtual machine image, wherein the virtual machine image configuration identifies hardware upon which the virtual machine is launched;
    changing the metadata configuration information to provide a configuration update to the virtual machine by a third-party vendor;
    receiving an API request including the single identifier to launch the virtual machine;
    in response to the request, launching the virtual machine using a virtual machine image, which includes software for booting the virtual machine, in conjunction with the virtual machine image configuration so that a first part of the registration record is used to launch the virtual machine; and
    after launch, further supplying the stored metadata configuration information to the virtual machine, which is free-form data or executable binaries that identify software to be loaded into the virtual machine, so that a second part of the registration record is used to configure a program running in the virtual machine and supplying configuration information to the virtual machine using user-defined metadata, the metadata configuration information being a first metadata configuration file and the user-defined metadata being a second metadata configuration file different than the first metadata configuration file, both the first and second metadata configuration files being used to configure the virtual machine after launch so that the virtual machine can perform self-customization.

2. The method of claim 1, wherein a hypervisor uses the virtual machine image configuration to launch the virtual machine and the virtual machine uses a metadata service to further configure itself using the stored metadata configuration information.

3. The method of claim 1, wherein the virtual machine image identifies at least an operating system to be used in the virtual machine.

4. A method of supplying configuration information to a virtual machine, comprising:
    storing, in a service center, metadata configuration information in association with a virtual machine image configuration by storing both the metadata configuration information and the virtual machine image configuration in a same registration record, wherein both the virtual machine image configuration and the metadata configuration information are identified by a single Application Programming Interface (API) request, wherein the virtual machine image configuration is associated with a virtual machine image and identifies virtual hardware used as a platform for the virtual machine image, the metadata configuration information including free-form data or executable binaries that identify at least one software package to be loaded, wherein both the virtual machine image configuration and the metadata configuration information are used in association with launching a virtual machine;
    launching the virtual machine using the virtual machine image configuration, wherein the launching of the virtual machine is upon the virtual hardware identified by the virtual machine image configuration and the launching is performed by a hypervisor executing on a server computer upon which the virtual machine is launched, and wherein the virtual machine image configuration is a first part of a configuration of the virtual machine; and
    after the launching of the virtual machine, supplying the metadata configuration information to configure a program running within the virtual machine, the metadata configuration information allowing the program running within the virtual machine to be configured by retrieving the at least one software package identified by the free-form data or the executable binaries, wherein the metadata configuration information is a second part of the configuration of the virtual machine and is retrieved through a metadata service.

5. The method of claim 4, wherein the metadata configuration information is provided by a third-party.

6. The method of claim 4, further including modifying the virtual machine image and changing virtual machine image configuration to point to the updated virtual machine image.

7. The method of claim 4, wherein the virtual machine image configuration is a first virtual machine image configuration and further including associating the metadata configuration information with a second virtual machine image configuration, different than the first virtual machine image configuration.

8. The method of claim 4, wherein the virtual machine image configuration identifies hardware upon which the virtual machine is run.

9. The method of claim 4, wherein a hypervisor uses the virtual machine image configuration to launch the virtual machine.

10. One or more computer-readable storage media having instructions stored thereon for executing a method, the method comprising:

receiving a request to launch a virtual machine;

determining a virtual machine image, a virtual machine image configuration, and metadata configuration information, which are together associated with launching of the virtual machine, wherein the virtual machine image configuration identifies the virtual hardware associated with the launching of the virtual machine, wherein the virtual machine image includes software used to boot the virtual machine, and wherein the metadata configuration information is stored in a same registration record with the virtual machine image configuration, so that both the virtual machine image configuration and the metadata configuration information are identified by a single Application Programming Interface request;

launching the virtual machine using the virtual machine image and the virtual machine image configuration; and as part of the launching process, supplying the metadata configuration information to the launched virtual machine so that the virtual machine can use the metadata configuration information to customize itself after launching, the metadata configuration information identifying software packages to be loaded into the virtual machine and the virtual machine interpreting or executing the metadata configuration information to obtain the software packages to load so that the virtual machine customizes itself after launching.

11. The one or more computer-readable storage of claim 10, wherein the virtual machine image configuration and the metadata configuration information are stored in a same registration record.

12. The one or more computer-readable storage of claim 10, further including launching, using a hypervisor, the virtual machine using the virtual machine image and configured according to the virtual machine image configuration.

13. The one or more computer-readable storage of claim 10, wherein the metadata configuration information is received by the virtual machine through a metadata service.

14. The one or more computer-readable storage of claim 10, further including self-configuring the virtual machine through receipt of user-defined metadata included in the request.

15. The one or more computer-readable storage of claim 10, further including updating the virtual machine image and changing the virtual machine image configuration to point to the updated version of the virtual machine image.

16. The one or more computer-readable storage of claim 10, further including allowing a third-party to modify the metadata configuration information so as to change how the virtual machine is configured.

17. The one or more computer-readable storage of claim 10, further including receiving a purchase request to access the metadata configuration information.

18. The one or more computer-readable storage of claim 10, wherein the metadata configuration information includes two or more files.

19. The one or more computer-readable storage of claim 18, wherein the two or more files include the binaries that are executable by the virtual machine.

\* \* \* \* \*